(12) United States Patent
Lee (10) Patent No.: US 7,327,351 B2
(45) Date of Patent: Feb. 5, 2008

(54) OPTICAL POINTING SYSTEM, SIGNAL TRANSMISSION METHOD OF THE SAME, AND SIGNAL PROCESSING METHOD OF COMPUTING APPARATUS USED IN THE SAME

(75) Inventor: Bang Won Lee, Yongin (KR)

(73) Assignee: AtLab Inc. (KR)

( * ) Notice: Subject to any disclaimer, the term of this patent is extended or adjusted under 35 U.S.C. 154(b) by 662 days.

(21) Appl. No.: 10/732,433

(22) Filed: Dec. 10, 2003

(65) Prior Publication Data

US 2004/0119695 A1 Jun. 24, 2004

(30) Foreign Application Priority Data

Dec. 10, 2002 (KR) ............... 10-2002-0078526

(51) Int. Cl.
*G06F 3/033* (2006.01)

(52) U.S. Cl. ............... 345/166; 345/157; 345/158

(58) Field of Classification Search ........ 345/163–166, 345/168, 173, 156–158
See application file for complete search history.

(56) References Cited

U.S. PATENT DOCUMENTS

| | | | |
|---|---|---|---|
| 4,794,384 A * | 12/1988 | Jackson | 345/166 |
| 5,994,710 A * | 11/1999 | Knee et al. | 250/557 |
| 6,172,354 B1 * | 1/2001 | Adan et al. | 250/221 |
| 6,664,948 B2 * | 12/2003 | Crane et al. | 345/166 |
| 6,741,335 B2 * | 5/2004 | Kinrot et al. | 356/28 |
| 6,795,056 B2 * | 9/2004 | Norskog et al. | 345/158 |
| 2002/0041282 A1 * | 4/2002 | Kitaguchi et al. | 345/418 |
| 2002/0080239 A1 * | 6/2002 | Ikeda et al. | 348/207 |

* cited by examiner

*Primary Examiner*—Richard Hjerpe
*Assistant Examiner*—Kimnhung Nguyen
(74) *Attorney, Agent, or Firm*—Cantor Colburn LLP (57) ABSTRACT

Disclosed is an optical pointing system, a signal transmission method of the same, and a signal processing method of a computer used in the optical pointing system. The optical pointing system comprises an image sensor for outputting an analog signal corresponding to a surface image, a signal conversion section for converting the analog signal of the image sensor into a digital image signal, a movement value calculation circuit for calculating a movement value using the digital image signal of the signal conversion section and outputting the calculated movement value, and a computer interface for receiving the digital image signal and the movement value and transmitting the digital image signal and the movement value to a computer. Thereby, an image signal of a worktable surface on which the optical pointing system is placed can be processed at not only the optical pointing system but also the computer, so that it is possible to calculate the accurate movement value of the optical pointing system. Further, the optical pointing system can provide the high accurate image signal to the computer, so that it is possible to function as a scanner.

9 Claims, 9 Drawing Sheets

OPTICAL POINTING SYSTEM, SIGNAL TRANSMISSION METHOD OF THE SAME, AND SIGNAL PROCESSING METHOD OF COMPUTING APPARATUS USED IN THE SAME

CROSS-REFERENCE TO RELATED APPLICATION

This application claims the benefit of Korean Patent Application No. 2002-78526, filed on Dec. 10, 2002, the disclosure of which is hereby incorporated herein by reference in its entirety.

BACKGROUND OF THE INVENTION

1. Field of the Invention

The present invention relates to an optical pointing system and, more particularly, to an optical pointing system, a signal transmission method of the same and a signal processing method of a computer used in the same, in which is a worktable surface's image signal detected by the optical pointing system is processed at not only the optical pointing system but also the computer, so that it is possible to calculate a movement value of the optical pointing system with accuracy.

2. Description of the Related Art

Figure 1:
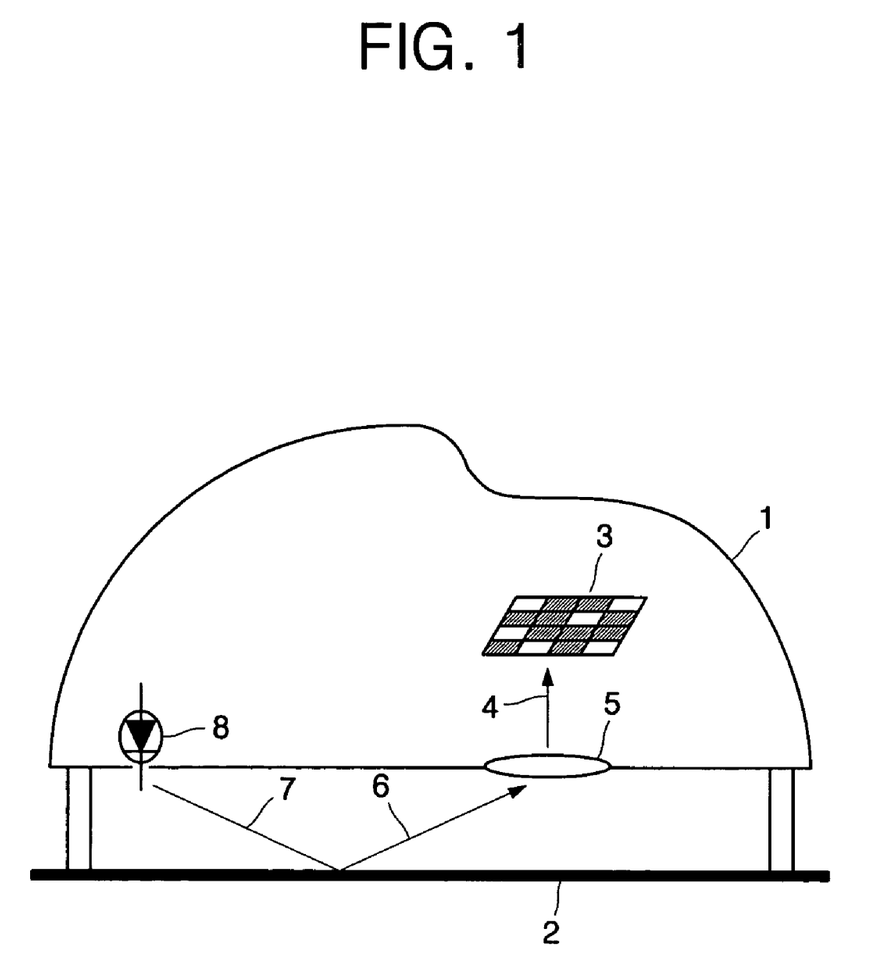
FIG. 1 illustrates a general optical pointing system.

FIG. 1 illustrates a schematic configuration of a general optical pointing system, which includes a light source 8, a lens 5, and an image sensor 3 in a sensor circuit (not shown).

In FIG. 1, among reference numerals, 2 represents a worktable surface and, 4, 6 and 7 represent light.

In the optical pointing system illustrated in FIG. 1, the light 7 emitted from the light source 8 is reflected on the worktable surface 2, and the reflected light 6 passes through the lens 5. The light 4 passing through the lens 5 is inputted into the image sensor 3, which is composed of complementary metal oxide semiconductor (CMOS) devices.

Images of the worktable surface 2 are continuously obtained by the image sensor 3 and are stored as image signals in a memory in the sensor circuit (not shown). The sensor circuit calculates a correlation between a present image signal which is currently inputted in the memory and a previous image signal which is previously stored in the memory, calculates a movement value from the calculated correlation, and transmits the calculated movement value to a system such as a computer.

Figure 2:
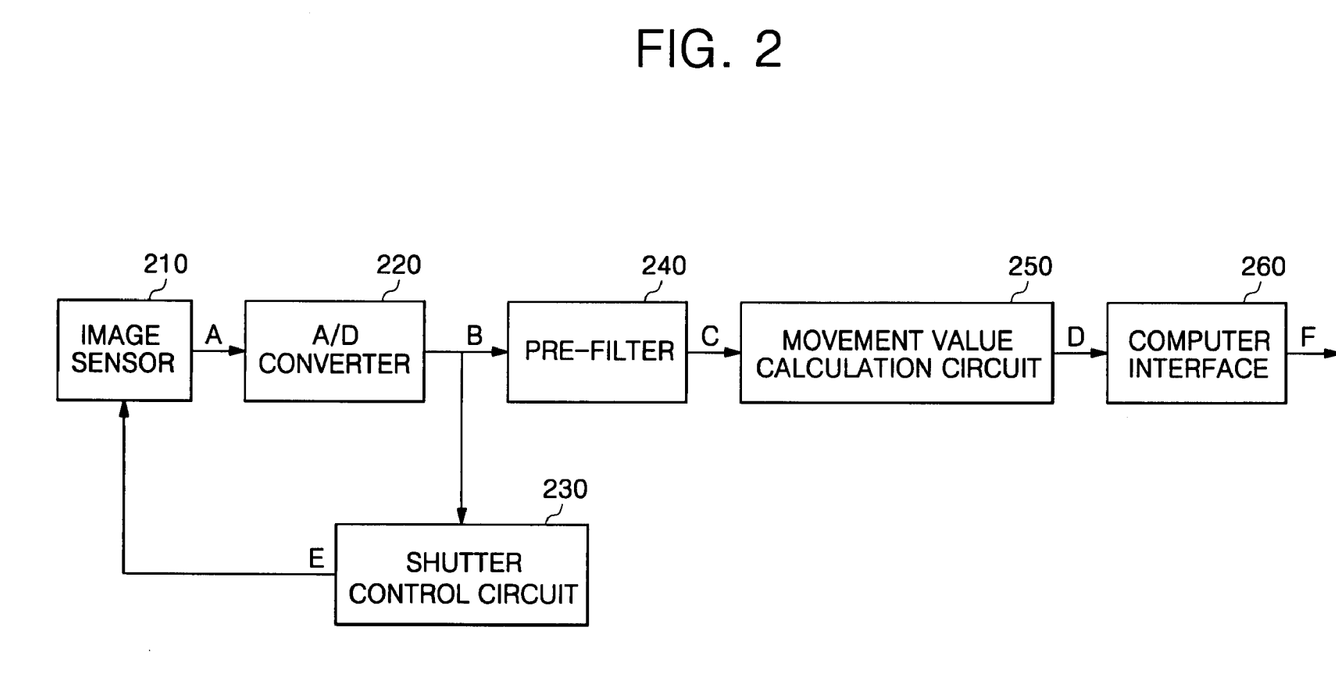
FIG. 2 shows a block diagram of a sensor circuit of a conventional optical pointing system.

FIG. 2 shows a block diagram of a sensor circuit of a conventional optical pointing system, which includes an image sensor 210, an A/D converter 220, a shutter control circuit 230, a pre-filter 240, a movement value calculation circuit 250, and a computer interface 260.

The sensor circuit of the conventional optical pointing system shown in FIG. 2 may be either integrated into one chip or composed of separate elements.

A function of each block shown in FIG. 2 will be described as follows.

The image sensor 210 controls a shutter-on time in response to a shutter control signal E, receives light incident through the lens for the shutter-on time to obtain images of the worktable surface, and generates an analog signal A corresponding to the obtained images.

The A/D converter 220 receives the analog signal A outputted from the image sensor 210, and converts the received analog signal A into a digital signal B.

The shutter control circuit 230 generates the shutter control signal E so that the digital signal B outputted from the A/D converter 220 has constant data distribution, and transmits the generated shutter control signal E to an electronic shutter (not shown) in the image sensor 210. The electronic shutter not shown is composed of the CMOS device in a circuit for the image sensor 210.

The pre-filter 240 receives the digital signal B outputted from the A/D converter 220, and converts the received digital signal B into data C for finding the movement value, and outputs the converted data C.

The movement value calculation circuit 250 receives the data C of the pre-filter 240, calculates the movement value of the optical pointing system using the received data C, and outputs the calculated movement value D of the optical pointing system.

The computer interface 260 outputs the movement value D outputted from the movement value calculation circuit 250 to the computer at a desired report rate.

Under the assumption that a sampling rate of the optical pointing system is 1500, that the number of pixels of the image sensor 210 is 18×18, that the A/D converter 240 generates 8-bit digital data, that the pre-filter 240 compresses the digital data of the A/D converter 240 into ⅛, and that the movement value calculation circuit 250 expresses movements of X and Y axes by 8 bits, amounts of data outputted from the A/D converter 220, the pre-filter 240 and the movement value calculation circuit 250 will be calculated as follows.

First, the amount of data processed per second by the A/D converter 220 is 3.888 Mbits (=18×18×1500×8), the amount of data outputted from the pre-filter 240 is 486 kbits (=3.888 Mbits/8), and the amount of data outputted from the movement value calculation circuit 250 is 24 kbits (=2×8×1500).

The computer interface 260 stores 24 kbits of data per second and transmits the data at a report rate which the computer requires.

By the way, in the case of a serial port of a conventional computer, i.e. PS2, because its transmission speed is too slow, the serial port has no alternative but to transmit the movement value. However, serial ports which are recently developed can transmit 1 Mbits of data per second due to their fast transmission speed. Thus, it is possible to transmit other data including the movement value.

In the sensor circuit of the conventional optical pointing system, the method for finding the movement value is fixed. Hence, in order to apply a new method for finding the movement value, either the conventional optical pointing system or the sensor circuit must be substituted. On the contrary, if a new method for finding the movement value may be implemented with the use of the computer without any exchange of the conventional optical pointing system or the sensor circuit, requirements of consumers who use the optical pointing system will be satisfied.

Besides, recently, increase in the transmission speed of the serial ports allows the computer to transmit a large amount of data per second, so that it is possible to find the movement value using the computer.

SUMMARY OF THE INVENTION

It is, therefore, an object of the present invention to provide an optical pointing system, a signal transmission method of the same and a signal processing method of a computing apparatus used in the same, capable of finding a movement value by means of not only the optical pointing system but also the computing apparatus.

In order to accomplish this object, according to a first aspect of the present invention, there is provided an optical pointing system comprising: an image sensor for outputting an analog signal corresponding to a surface image; a signal conversion section for converting the analog signal of the image sensor into a digital image signal; a movement value calculation circuit for calculating a movement value using the digital image signal of the signal conversion section and outputting the calculated movement value; and a computing interface for receiving the digital image signal and the movement value and transmitting the digital image signal and the movement value to a computing apparatus.

In order to accomplish this object, according to a second aspect of the present invention, there is provided an optical pointing system comprising: an image sensor for outputting an analog signal corresponding to a surface image; a signal conversion section for converting the analog signal of the image sensor into a digital image signal; a movement value calculation circuit for calculating a movement value using the digital image signal of the signal conversion section and outputting the calculated movement value; and a computing interface for receiving the digital image signal and the movement value, obtaining the digital image signal corresponding to a non-overlapped image region in response to the movement value, and transmitting the digital image signal of the non-overlapped image region and the movement value to a computing apparatus.

In order to accomplish this object, according to a first aspect of the present invention, there is provided a signal transmission method of an optical pointing system, comprising the steps of: generating a digital image signal corresponding to a surface image and an image signal including a movement value using the digital image signal; checking whether or not an image signal request is received from a computing apparatus; and as the checked result, transmitting the digital image signal and the movement value to the computing apparatus if the image signal request is received, and transmitting the movement value to the computing apparatus if the image signal request is not received.

In order to accomplish this object, according to a second aspect of the present invention, there is provided a signal transmission method of an optical pointing system, comprising the steps of: generating a digital image signal corresponding to a surface image and a movement value using the digital image signal; checking whether or not an image signal request is received from a computing apparatus; and as the checked result, obtaining the digital image signal corresponding to a non-overlapped sample frame region and transmitting the obtained digital image signal and the movement value to the computing apparatus if the image signal request is received, and transmitting the movement value to the computing apparatus if the image signal request is not received.

In order to accomplish this object, according to a first aspect of the present invention, there is provided a signal processing method of a computing apparatus used for optical pointing purpose, comprising the steps of: transmitting an image signal request to the optical pointing system; when receiving a digital image signal and a movement value from the optical pointing system, obtaining a sample frame corresponding to the received results, and calculating the movement value by comparison of the obtained sample frame and a previous frame; and when the calculated movement value is identical to the received movement value, adopting the received movement value as the movement value of the optical pointing system, and when the calculated movement value is not identical to the received movement value, adopting the calculated movement value as the movement value of the optical pointing system.

In order to accomplish this object, according to a second aspect of the present invention, there is provided a signal processing method of a computing apparatus used for optical pointing purpose, comprising the steps of: transmitting an image signal request to the optical pointing system; when receiving a digital image signal corresponding to a non-overlapped region and a movement value from the optical pointing system, obtaining a sample frame corresponding to the received results, and calculating the movement value by comparison of the obtained sample frame and a previous frame; and when the calculated movement value is identical to the received movement value, adopting the received movement value as the movement value of the optical pointing system, and when the calculated movement value is not identical to the received movement value, adopting the calculated movement value as the movement value of the optical pointing system.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the lengths, the thickness, etc. of layers and regions are exaggerated for clarity. Like numbers refer to like elements throughout the specification.

Figure 3:
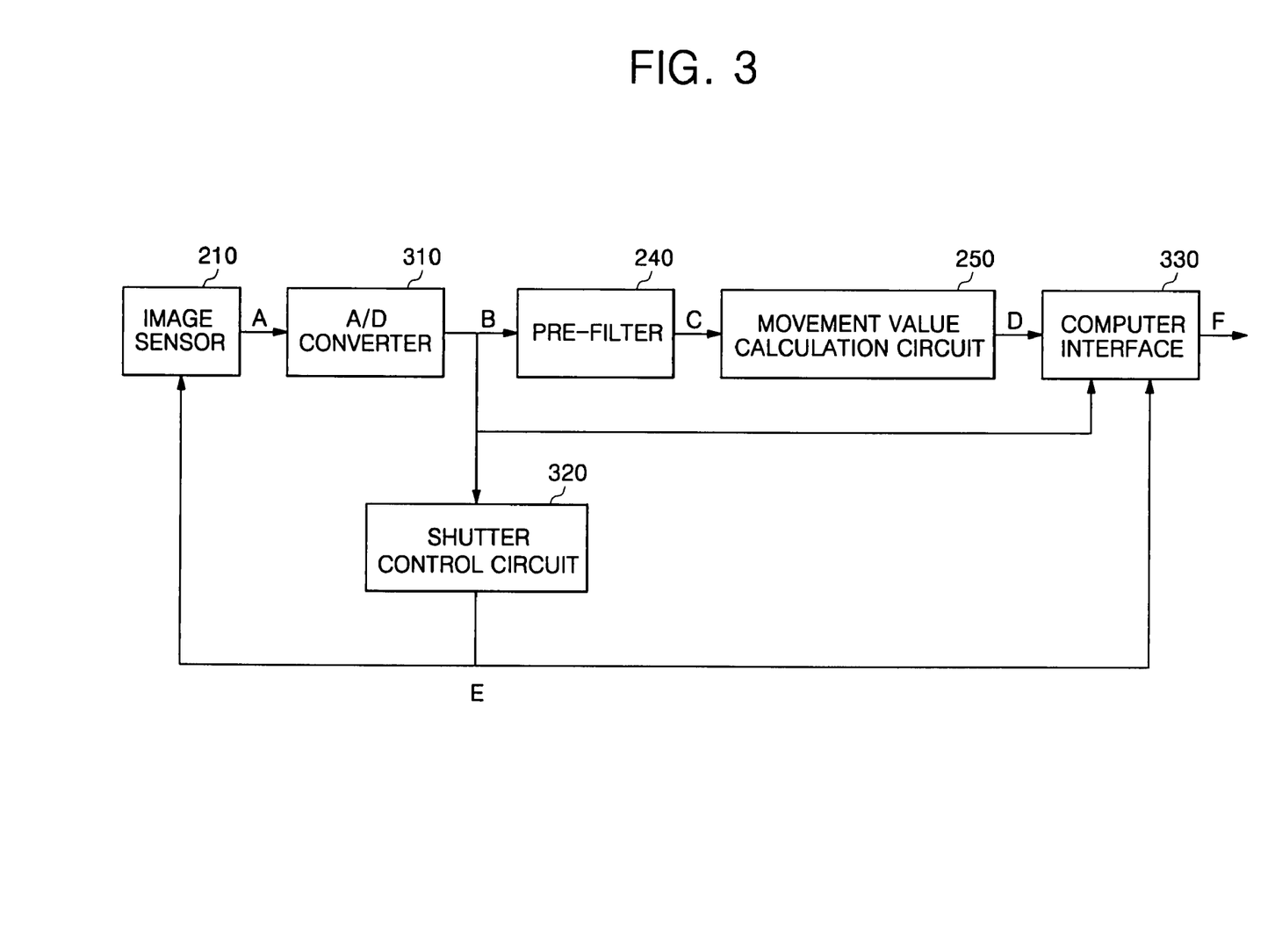
FIG. 3 shows a block diagram of a sensor circuit of an optical pointing system according to a first embodiment of the invention.

FIG. 3 shows a block diagram of a sensor circuit of an optical pointing system according to a first embodiment of the invention.

The sensor circuit of FIG. 3 has components similar to that of FIG. 2, more particularly, an A/D converter 310 instead of the A/D converter 220, a shutter control circuit 320 instead of the shutter control circuit 230, and a computer interface 330 instead of the computer interface 260.

For this reason, a detailed description will be omitted regarding the sensor circuit of FIG. 3, which performs the same operation as that of FIG. 2.

The A/D converter 310 converts an analog signal A of the image sensor 210 into a digital signal B, and provides the converted digital signal B to the shutter control circuit 320 and the pre-filter 240 and the computer interface 330.

The shutter control circuit 320 generates a shutter control signal E corresponding to the digital signal B of the A/D converter 310, and provides the generated shutter control signal E to the image sensor 210 and the computer interface 330.

The computer interface 330 receives the digital signal B from the AND converter 310, the shutter control signal E from the shutter control circuit 320, and a movement value D from the movement value calculation circuit 250. If an image signal request is received from the computer, an image signal F which includes the digital signal B, the shutter control signal E and the movement value D is provided to the computer. However, if the image signal request is not received, only the movement value D is provided to the computer.

Thus, the computer can select whether to receive only the movement value D or the image signal F including the digital signal B, the shutter control signal E and the movement value D with the use of the image signal request.

In other words, in case that it is determined that the computer is in an overload state due to other jobs or that the optical pointing system performs normal operation, the computer receives only the movement value D from the optical pointing system. However, in case that it is determined that the computer has sufficient calculation capacity or that the optical pointing system performs abnormally, the computer receives the image signal F from the optical pointing system using the image signal request, and directly calculates the movement value of the optical pointing system.

In this manner, when the movement value of the optical pointing system is directly calculated at the computer, various pre-filter modes and movement detection modes can be employed, so that a more accurate movement value can be calculated.

Further, in the case of the computer capable obtaining access to Internet, the computer freely downloads various methods of finding movements through the Internet, and can continuously assist improvement in performance of the movement calculation method without exchanging hardware of the optical pointing system.

Further, the computer directly receives the image signals from the worktable surface, and puts together the image signals one by one to build a single large image or to generate information like a barcode. In this manner, the computer can generate more various contents to provide users.

Figure 4A:
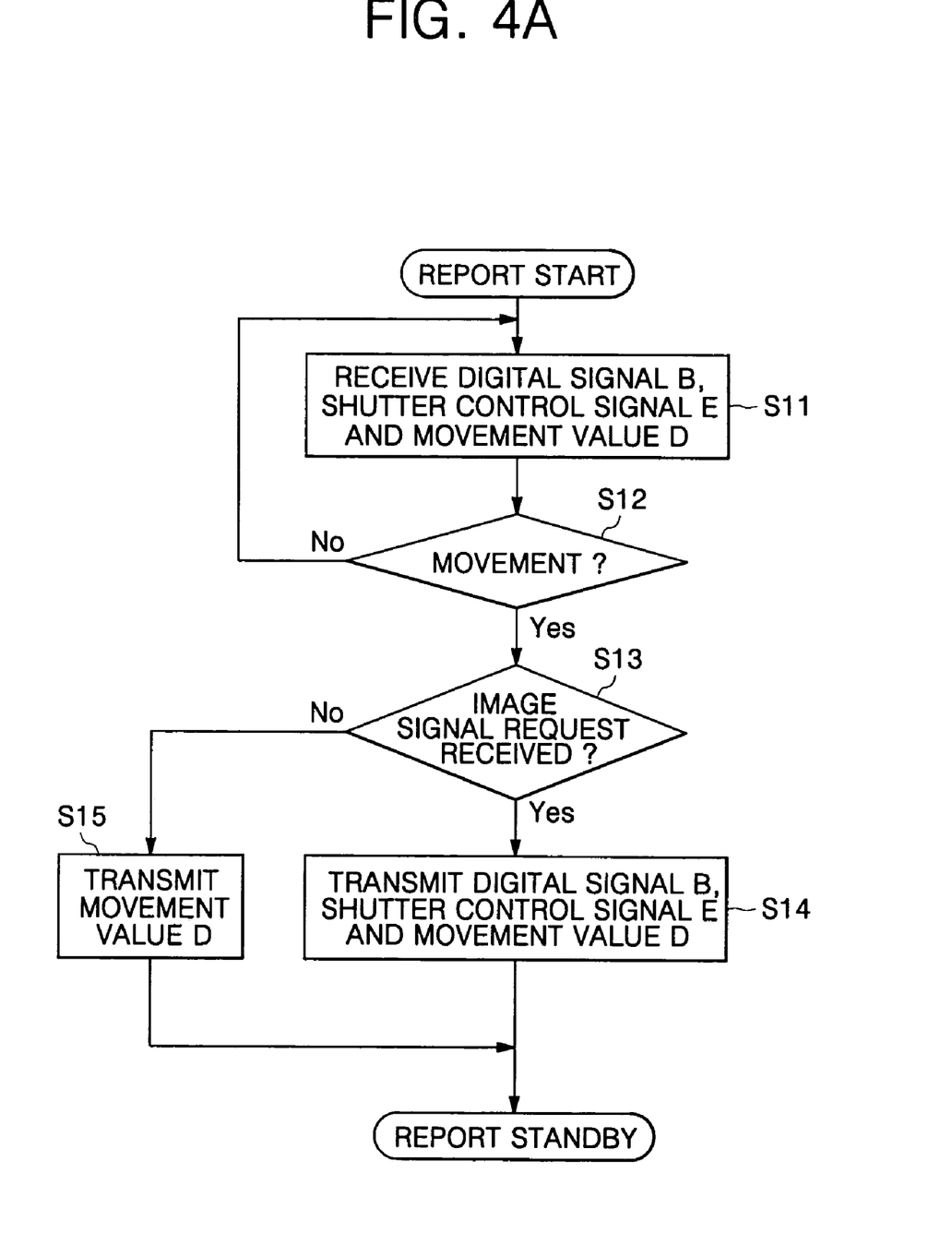
FIGS. 4a and 4b are flow charts for explaining operations of both a sensor circuit of an optical pointing system and a computer used in the optical pointing system according to a first embodiment of the invention.
Figure 4B:
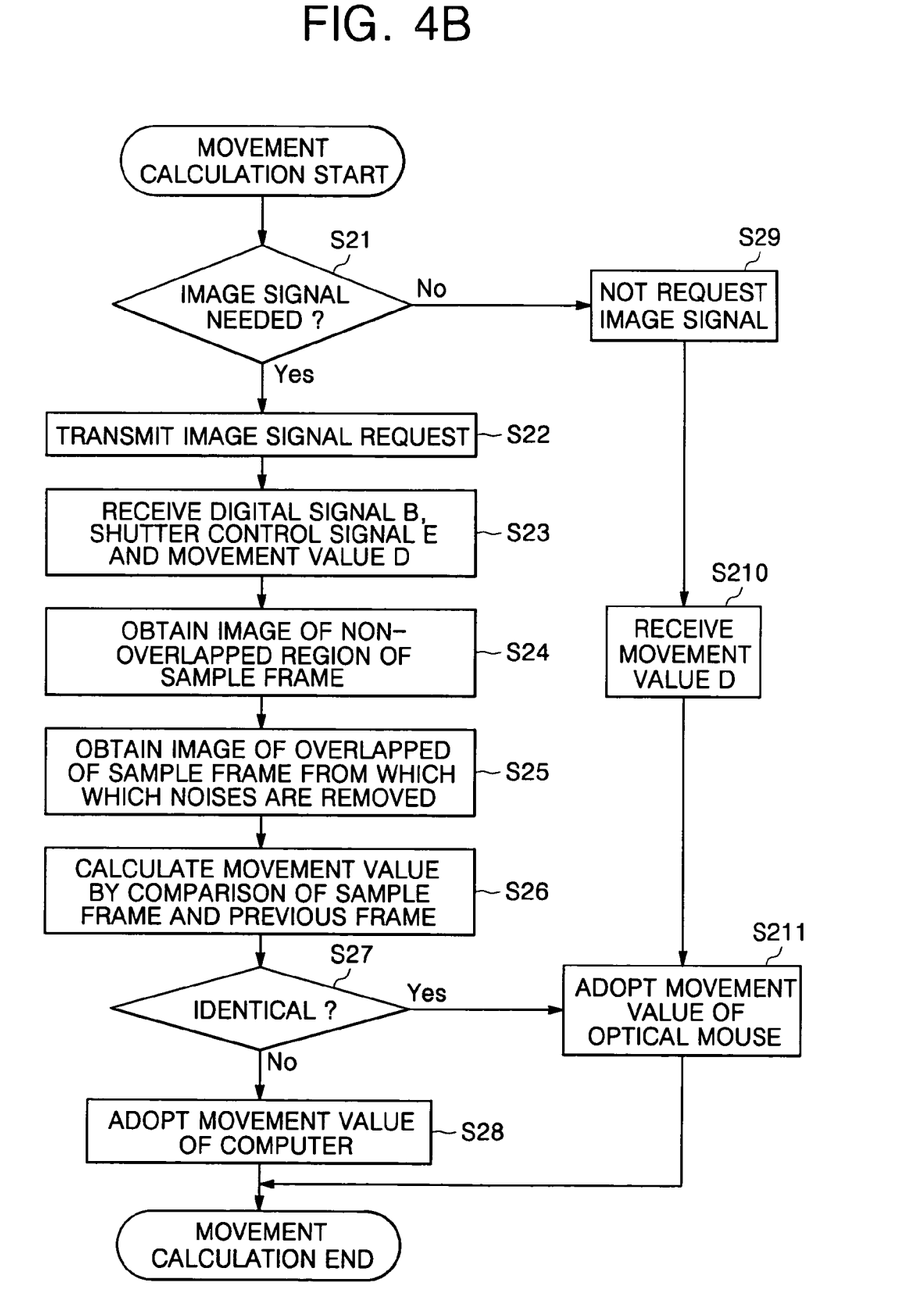

FIGS. 4a and 4b are flow charts for explaining operations of both a sensor circuit of an optical pointing system and a computer used in the optical pointing system according to a first embodiment of the invention.

FIG. 4a is a flow chart for explaining an operation of the sensor circuit of the optical pointing system. When the optical pointing system initiates a report operation, the computer interface 330 receives the digital signal B, the shutter control signal E and the movement value D from the A/D converter 310, the shutter control circuit 320 and the movement value calculation circuit 250, respectively (S11).

Figure 5:
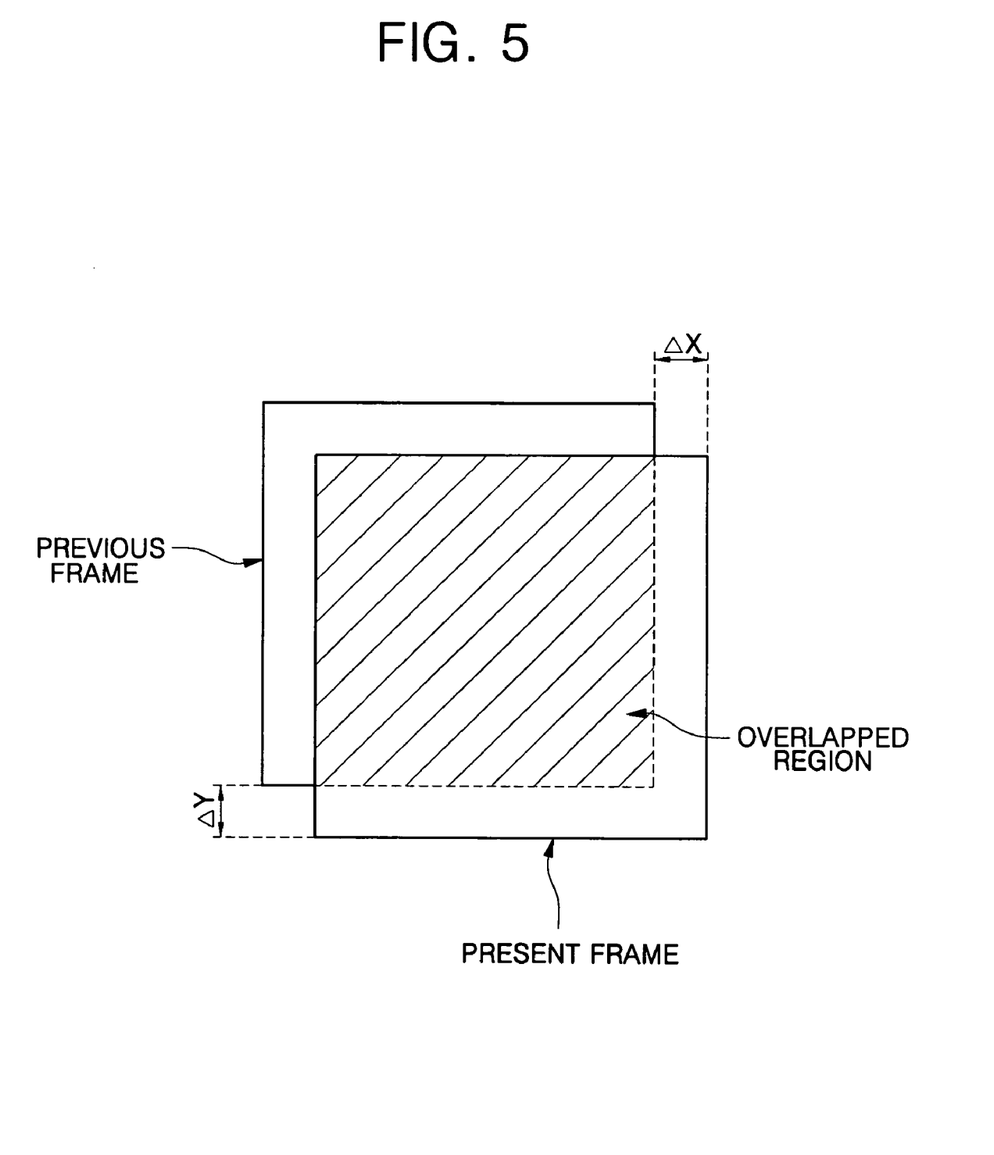
FIG. 5 shows frame data read out by a sensor chip of an optical pointing system during a movement of the optical pointing system.

Here, the movement value D is X- and Y-axial ones, which are calculated by comparison of the previous frame with the present sample frame, as shown in FIG. 5.

The computer interface 330, which receives the digital signal B, the shutter control signal E and the movement value D, checks whether or not movement of the optical pointing system exists by reading out the received movement value D (S12). As the checked result, if the movement of the optical pointing system does not exist, there is a return to the step S11.

On the contrary, if the movement of the optical pointing system exists, it is ascertained whether or not an image signal request is received from the computer (S13).

As the ascertained result, if the image signal request is received from the computer, the computer interface 330 transmits the image signal F, which includes the digital signal B, the shutter control signal E and the movement value D, to the computer (S14).

As the ascertained result of the step S13, if the image signal request is not received from the computer, the computer interface 330 transmits only the movement value D to the computer (S15).

In this manner, when the request of the computer exists, the optical pointing system transmits the image signal F, which includes the digital signal B, the shutter control signal E and the movement value D.

Thus, the computer performs the operation as shown in FIG. 4b to more accurately calculate the movement value of the optical pointing system.

Now, referring to FIG. 4b, the computer checks whether or not the image signal of the sensor circuit of the optical pointing system is needed to calculate the accurate movement value of the optical pointing system by checking whether the sufficient calculation capacity is left in the computer or the optical pointing system performs abnormally (S21).

As the checked result of the step S21, if the image signal of the sensor circuit of the optical pointing system is needed, the computer generates the image signal request, and then transmits the generated image signal request to the sensor circuit of the optical pointing system (S22).

Thus, the image signal F including the digital signal B, the shutter control signal E and the movement value D is transmitted from the sensor circuit of the optical pointing system to the computer(S23). Further, as shown in FIG. 5, the computer detects a region of non-overlapped sample frames using the movement value D having X- and Y-axial values, and obtains an image of the non-overlapped sample frame region using the digital signal B (S24).

As shown in FIG. 5, the computer obtains the region of overlapped sample frames and the image of the overlapped sample frame region with the use of both the movement value D having X- and Y-axial values and the digital signal B, and removes noises and mismatches of shutter times which exist on the region overlapped between the previous frame and the sample frame using the shutter control signal E (S25). Thus, the computer can obtain the previous frame and the present sample frame, which have more accurate images.

Then, the computer compares the sample frame obtained in the steps S24 and S25 with the previous frame to calculate the movement value of the optical pointing system (S26).

It is checked whether or not the movement value D of the optical pointing system transmitted the computer interface 330 is identical to that of the computer calculated in the step S26 (S27).

As the checked result, if the movement value D of the optical pointing system is not identical to that of the computer, the computer determines that the optical pointing system performs abnormally and adopts the movement value of the computer calculated in the step S26 as the movement value D of the optical pointing system (S28). However, if not so, the movement value D of the optical pointing system is adopted (S211).

On the contrary, as the checked result of the step S21, if the image signal of the image sensor of the optical pointing system is not required because the computer is in an overload state due to other jobs, or because the optical pointing system performs normal operation, the computer does not generate and transmit the image signal request (S29).

Therefore, when the sensor circuit of the optical pointing system transmits the movement value D, the computer receives the movement value D (S210) and adopts the received movement value D of the optical pointing system as the movement value of the optical pointing system (S211).

In this manner, in the case that the sufficient calculation capacity is left in the computer or that the optical pointing system performs abnormally, the computer directly receives the image signal from the sensor circuit of the optical pointing system and calculates the movement value of the optical pointing system.

As a result, the computer obtains the movement value of the optical pointing system in a more accurate and rapid manner.

Figure 6A:
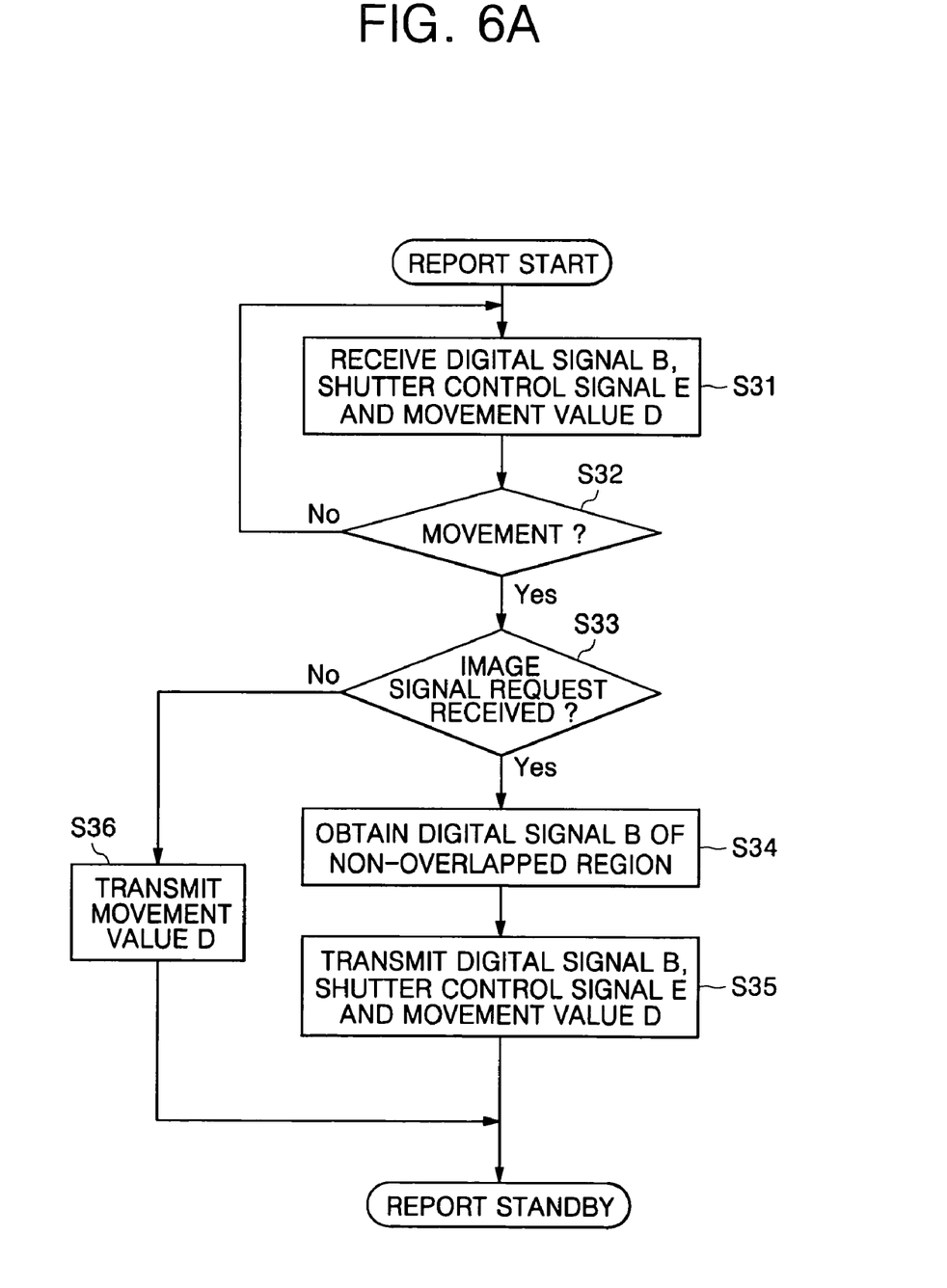
FIGS. 6a and 6b are flow charts for explaining operations of both a sensor circuit of an optical pointing system and a computer used in the optical pointing system according to a second embodiment of the invention.
Figure 6B:
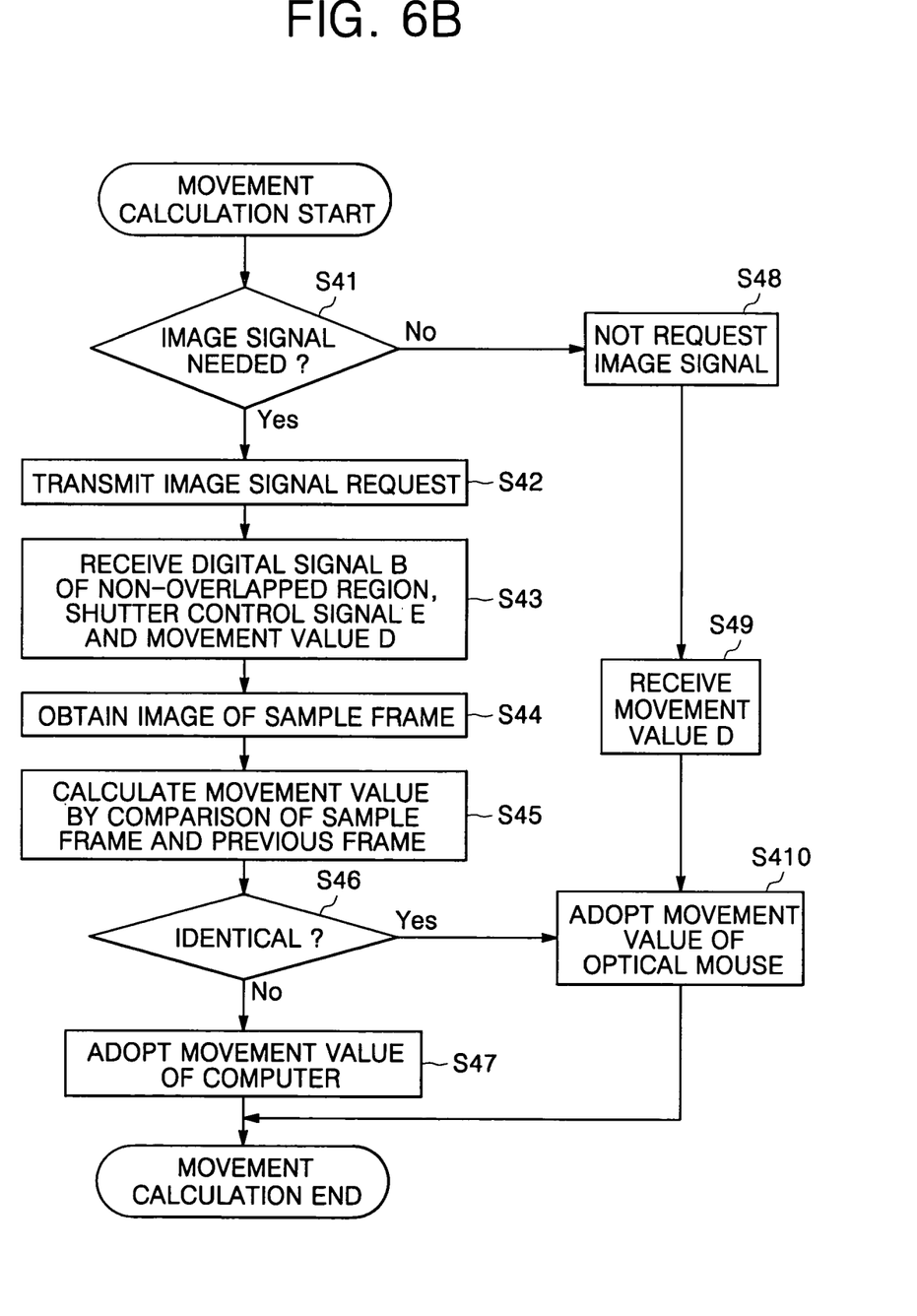

FIGS. 6a and 6b are flow charts for explaining operations of both a sensor circuit of an optical pointing system and a computer used for optical pointing purpose according to a second embodiment of the invention.

FIG. 6a is a flow chart for explaining an operation of the sensor circuit of the optical pointing system. When the optical pointing system initiates a report operation, the computer interface 330 receives the digital signal B, the shutter control signal E and the movement value D from the A/D converter 310, the shutter control circuit 320, and the movement value calculation circuit 250, respectively (S31).

The computer interface 330, which receives the digital signal B, the shutter control signal E and the movement value D, checks whether or not movement of the optical pointing system exists by reading out the received movement value D (S32). As the checked result, if the movement of the optical pointing system does not exist, there is a return to the step S31.

On the contrary, if the movement of the optical pointing system exists, it is ascertained whether or not an image signal request is received from the computer (S33).

As the ascertained result of the step S33, if the image signal request is received from the computer, the computer interface 330 obtains the digital signal B of an non-overlapped sample frame region using the movement value D (S34), and transmits the image signal F, which includes the obtained digital signal B of the non-overlapped sample frame region, the shutter control signal E and the movement value D, to the computer (S35).

As the ascertained result of the step S33, if the image signal request is not received from the computer, the computer interface 330 transmits the movement value D to the computer (S36).

In this manner, according to the request of the computer, the optical pointing system transmits the digital signal B of the non-overlapped sample frame region together with the shutter control signal E and the movement value D. Therefore, the transmission capacity of the computer interface is decreased.

Then, the computer performs operation as shown in FIG. 6b to calculate the movement value of the optical pointing system.

Subsequently, referring to FIG. 6b, the computer checks whether or not the image signal of the sensor circuit of the optical pointing system is needed to calculate the accurate movement value of the optical pointing system by checking whether the sufficient calculation capacity is left in the computer or the optical pointing system performs abnormally (S41).

As the checked result of the step S41, if the image signal of the sensor circuit of the optical pointing system is needed, the computer generates the image signal request, and then transmits the generated image signal request to the sensor circuit of the optical pointing system (S42).

In response to this, when the image signal F including the digital signal B of the non-overlapped sample frame region, the shutter control signal E and the movement value D are transmitted from the sensor circuit of the optical pointing system, and the computer receives the transmitted image signal F (S43).

As shown in FIG. 5, when received the image signal F, the computer obtains an image of the non-overlapped sample frame region with the use of both the movement value D having X- and Y-axial values and the digital signal B of the non-overlapped sample frame region. Further, the computer detects a region of overlapped previous frames using the movement value D and the previous frame, applies the shutter control signal E to the detected previous frame region to obtain the image of the overlapped sample frame region, and obtains the whole image of the sample frame (S44). The computer which obtains the current sample frame in the step S44 compares the obtained sample frame with the previous frame, and calculates the movement value of the optical pointing system (S45).

It is checked whether or not the movement value D of the optical pointing system transmitted to the computer interface 330 is identical to that of the computer calculated in the step S45 (S46).

As the checked result, if the movement value D of the optical pointing system is not identical to that of the computer, the computer determines that the optical pointing system performs abnormally and adopts the movement value of the computer calculated in the step S45 as the movement value of the optical pointing system (S47). However, if not so, there proceeds to a step S410.

On the contrary, as the checked result of the step S41, if the image signal of the image sensor of the optical pointing system is not required because the computer is in an overload state due to other jobs or because the optical pointing system performs normally, the computer does not generate and transmit the image signal request (S48).

Therefore, when the sensor circuit of the optical pointing system transmits the movement value D, the computer receives the movement value D (S49) and adopts the received movement value D of the optical pointing system as the movement value of the optical pointing system (S410).

In this manner, the sensor circuit of the optical pointing system according to the second embodiment of the invention decreases the transmission capacity of the computer interface because the computer interface selectively provides only the digital signal of the non-overlapped sample frame region to the computer.

Figure 7:
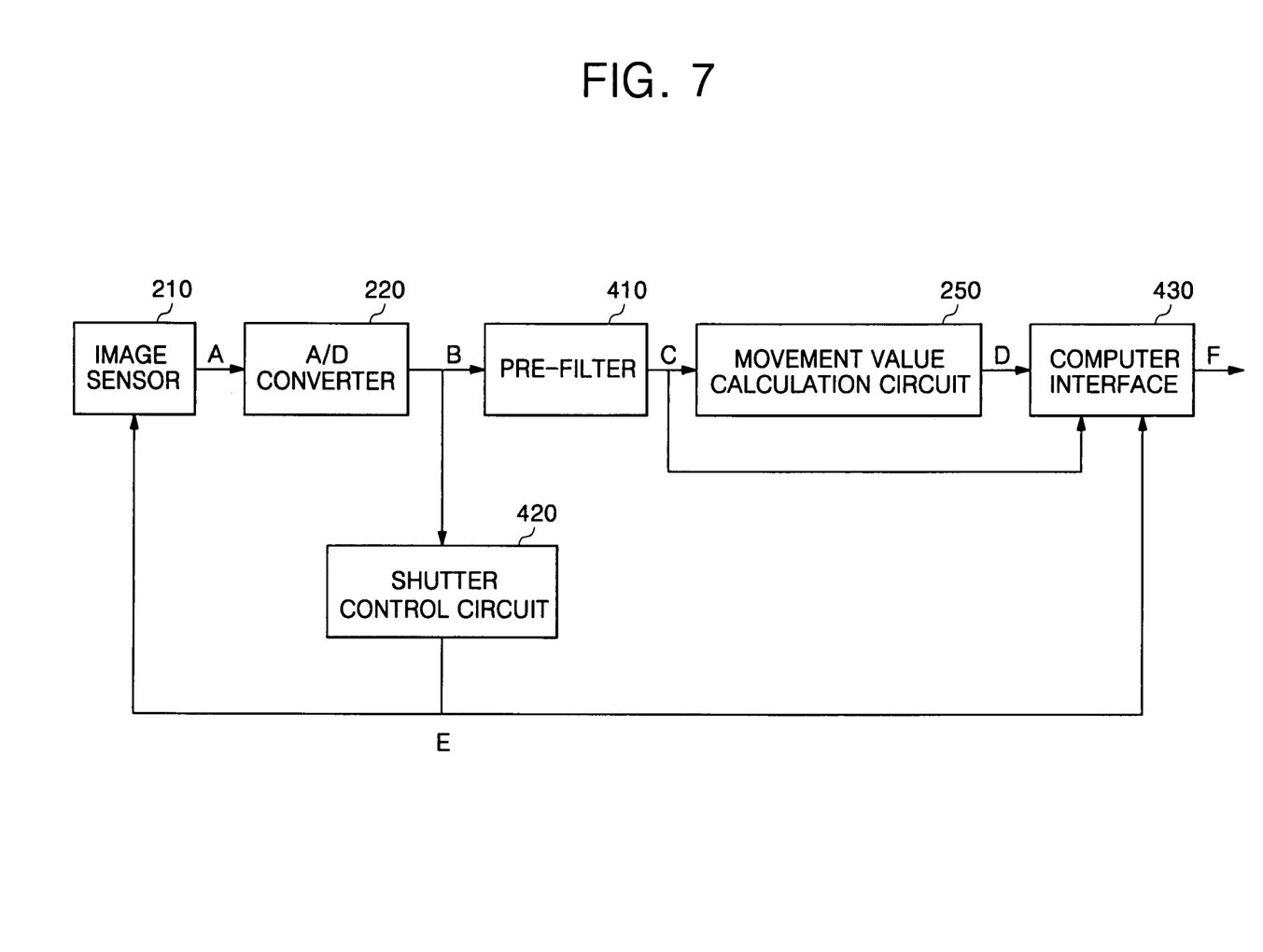
FIG. 7 shows a block diagram of a sensor circuit of an optical pointing system according to a second embodiment of the invention.

FIG. 7 is a block diagram illustrating a sensor circuit of an optical pointing system according to a second embodiment of the invention. As shown in FIG. 7, the sensor circuit of the optical pointing system of the invention supplies the data C converted by a pre-filter 410 to a computer interface 430.

The computer interface 430 supplies the data C having a less amount of information to the computer, thus the transmission capacity of the computer interface can be decreased.

Although a preferred embodiment of the present invention has been described for illustrative purposes, it is apparent to those skilled in the art that various modifications, additions and substitutions are possible, without departing from the scope and spirit of the invention as disclosed in the accompanying claims.

As can seen from the foregoing, according to the optical pointing system, the signal transmission method of the same, and the signal processing method of the computer used in the same, the optical pointing system is designed to provide the computer with not only the movement value but also the image signal of the workable surface which the optical pointing system detects. Therefore, the optical pointing system allows the computer to selectively receive the image signal of the worktable surface if necessary, so that the computer can calculate the movement value of the optical pointing system using the received image signal to detect the movement of the optical pointing system in a more accurate and rapid manner.

Further, the optical pointing system of the invention provides the high accurate image signal to the computer, so that it can function as a scanner.

Moreover, the computer capable to access Internet can download various methods of finding movements, so that it is possible to continuously improve performance of the movement calculation method without exchanging hardware of the optical pointing system.

What is claimed is:

1. An optical pointing system comprising:
   an image sensor which outputs an analog signal corresponding to a surface image;
   a signal conversion section which converts the analog signal of the image sensor into a digital image signal;
   a movement value calculation circuit which calculates a movement value using the digital image signal of the signal conversion section and outputs the calculated movement value; and
   an interface which receives the digital image signal from the signal conversion section and the calculated movement value from the movement value movement value calculation circuit, and transmits the digital image signal and the calculated movement value to a computing apparatus when a transmission request of an image signal is received from the computing apparatus, and transmits only the calculated movement value to the computing apparatus when a transmission request of the image signal is not received,
   wherein the computing apparatus directly calculates a movement value of the optical pointing system based upon the transmitted digital image signal and the calculated movement value received.

2. An optical pointing system comprising:
   an image sensor which outputs an analog signal corresponding to a surface image;
   a signal conversion section which converts the analog signal of the image sensor into a digital image signal;
   a movement value calculation circuit which calculates a movement value using the digital image signal of the signal conversion section and outputs the calculated movement value;
   a shutter control circuit which generates a shutter control signal in response to the digital image signal of the signal conversion section, and outputs the generated shutter control signal to the image sensor and an interface; and
   the interface transmits the digital image signal, the shutter control signal and the calculated movement value to a computing apparatus when a transmission request of the image signal is received from the computing apparatus, and transmits only the calculated movement value to the computing apparatus when a transmission request of the signal is not received,
   wherein the computing apparatus directly calculates a movement value of the optical pointing system based upon the transmitted digital image signal, the shutter control signal and the calculated movement value received.

3. An optical pointing system comprising:
   an image sensor which outputs an analog signal corresponding to a surface image;
   a signal conversion section which converts the analog signal of the image sensor into a digital image signal;
   a movement value calculation circuit which calculates a movement value using the digital image signal of the signal conversion section and outputs the calculated movement value; and
   an interface which receives the digital image signal and the calculated movement value, obtains the digital image signal corresponding to a non-overlapped image region in response to the calculated movement value, and transmits the digital image signal of the non-overlapped image region and the calculated movement value to a computing apparatus, wherein the computing apparatus directly calculates a movement value of the optical pointing system based upon the transmitted digital image signal and the calculated movement value received.

4. The optical pointing system as claimed in claim 3, wherein the interface transmits the digital image signal of the non-overlapped image region and the movement value to the computing apparatus when a transmission request of an image signal is received from the computing apparatus, and transmits only the calculated movement value to the computing apparatus when a transmission request of the image signal is not received.

5. A signal transmission method of an optical pointing system, comprising:
   generating a digital image signal corresponding to a surface image and an image signal including a movement value and a shutter control signal for controlling an exposure time of an image sensor using the digital image signal;
   checking whether or not an image signal request is received from a computing apparatus; and
   as the checked result, transmitting the digital image signal and the movement value and the shutter control signal to the computing apparatus when the image signal request is received, and transmitting the movement value to the computing apparatus when the image signal request is not received,
   wherein transmitting the digital image signal, the movement value and the shutter control signal to the computing apparatus further comprises obtaining, via the computing apparatus, a sample frame corresponding to the received digital image signal, movement value and shutter control signal, calculating a movement value of the optical pointing system, via the computing apparatus, by comparing the obtained sample frame and a previous frame, and removing noises which exist on a region overlapped between the sample frame and the previous frame in consideration of the shutter control signal.

6. A signal transmission method of an optical pointing system, comprising:

generating a digital image signal corresponding to a surface image and a movement value and a shutter control signal for controlling an exposure time of an image sensor using the digital image signal;

checking whether or not an image signal request is received from a computing apparatus; and as the checked result, obtaining the digital image signal corresponding to a non-overlapped sample frame region and transmitting the obtained digital image signal and the movement value and the shutter control signal to the computing apparatus when the image signal request is received, and transmitting the movement value to the computing apparatus when the image signal request is not received, wherein transmitting the digital image signal, the movement value and the shutter control signal to the computing apparatus further comprises obtaining, via the computing apparatus, a sample frame corresponding to the received digital image signal, movement value and shutter control signal, calculating a movement value of the optical pointing system, via the computing apparatus, by comparing the obtained sample frame and a previous frame, and removing noises which exist on a region overlapped between the sample frame and the previous frame in consideration of the shutter control signal.

7. A signal processing method of a computing apparatus used in an optical pointing system, comprising:

transmitting an image signal request to the optical pointing system;

when receiving a digital image signal and a movement value from the optical pointing system, obtaining a sample frame corresponding to the digital image signal received, and calculating the movement value by comparison of the obtained sample frame and a previous frame; and when the calculated movement value is identical to the received movement value, adopting the received movement value as the movement value of the optical pointing system, and when the calculated movement value is not identical to the received movement value, adopting the calculated movement value as the movement value of the optical pointing systems, and wherein calculating the movement value further comprises removing noises which exist on a region overlapped between the sample frame and the previous frame in consideration of the shutter control signal.

8. The signal processing method as claimed in claim 7, wherein calculating the movement value comprises:

obtaining the sample frame using the received digital image signal and movement value; and calculating the movement value by comparison of the sample frame and the previous frame.

9. A signal processing method of a computing apparatus used in an optical pointing system, comprising:

transmitting an image signal request to the optical pointing system from the computing apparatus;

when receiving a digital image signal corresponding to a non-overlapped region and a movement value from the optical pointing system, obtaining, via the computing apparatus a sample frame corresponding to the received digital image signal and movement value, and calculating a movement value of the optical pointing system via the computing apparatus, by comparison of the obtained sample frame and a previous frame; and when the calculated movement value is identical to the received movement value, adopting the received movement value as the movement value of the optical pointing system, and when the calculated movement value is not identical to the received movement value, adopting the calculated movement value as the movement value of the optical pointing system.

* * * * *